(12) United States Patent
Cong

(10) Patent No.: US 8,490,738 B2
(45) Date of Patent: Jul. 23, 2013

(54) COMPRESSED AIR ENGINE AND MOTOR VEHICLE

(76) Inventor: Yang Cong, Guangdong (CN)

( * ) Notice: Subject to any disclaimer, the term of this patent is extended or adjusted under 35 U.S.C. 154(b) by 0 days.

(21) Appl. No.: 13/284,458

(22) Filed: Oct. 28, 2011

(65) Prior Publication Data

US 2012/0132477 A1    May 31, 2012

Related U.S. Application Data

(63) Continuation of application No. PCT/CN2010/072297, filed on Apr. 28, 2010.

(51) Int. Cl.
*B60K 3/00*    (2006.01)

(52) U.S. Cl.
USPC .......................................... 180/302; 180/305

(58) Field of Classification Search
USPC ................... 180/2.1, 2.2, 301, 302, 303, 304
See application file for complete search history.

(56) References Cited

U.S. PATENT DOCUMENTS

| | | | | |
|---|---|---|---|---|
| 2,631,427 A | * | 3/1953 | Rainbow | 60/792 |
| 3,039,552 A | * | 6/1962 | Lange | 180/302 |
| 3,446,306 A | * | 5/1969 | Williams | 180/301 |
| 3,878,913 A | * | 4/1975 | Lionts et al. | 180/2.2 |
| 4,179,007 A | | 12/1979 | Howe | |
| 6,138,781 A | | 10/2000 | Hakala | |
| 7,997,371 B2 | * | 8/2011 | Khymych | 180/165 |
| 2010/0300775 A1 | * | 12/2010 | Dravis | 180/2.2 |
| 2011/0031043 A1 | * | 2/2011 | Armani et al. | 180/2.2 |

FOREIGN PATENT DOCUMENTS

| | | |
|---|---|---|
| CN | 1010035246 A | 3/2008 |
| CN | 201155336 Y | 11/2008 |
| CN | 101550914 A | 10/2009 |
| CN | 201461257 U | 5/2010 |
| WO | 2008022556 A1 | 2/2008 |

* cited by examiner

*Primary Examiner* — Hau Phan
*Assistant Examiner* — Bridget Avery
(74) *Attorney, Agent, or Firm* — Lathrop & Gage LLP

(57) ABSTRACT

A compressed air engine comprises a housing and an impeller body fixed on a primary power output shaft and located within the housing. An ejecting inlet ejects air to the impeller body in the housing. Working chambers are provided on the impeller body. The inner surface of the housing closes the working chambers so that the compressed air ejected to the working chambers pushes the impeller body to rotate and is temporarily stored in the working chamber, and an ejecting outlet is provided on the housing so that the compressed air temporarily stored in the working chamber expands outwards when the compressed air is rotated to the gas ejecting outlet and do work to further push the impeller body to rotate.

5 Claims, 5 Drawing Sheets

COMPRESSED AIR ENGINE AND MOTOR VEHICLE

RELATED APPLICATIONS

This application is a continuation of PCT Patent Application Serial No. PCT/CN2010/072297, which claims priority to Chinese Patent Application Serial No. 200910302072.0 filed Apr. 30, 2009, the disclosures of which are incorporated herein by reference.

TECHNICAL FIELD

The present application relates to a compressed air engine and a motor vehicle.

BACKGROUND

In order to avoid severe environmental pollution and directly utilize the wind resistance airflow encountered by a motor vehicle while running, a U.S. patent application Ser. No. 11/802,341 issued to the applicant of the present application provides an engine comprising left and right wind-powered pneumatic engines arranged symmetrically. Each of the left and right wind-powered pneumatic engines comprises an impeller chamber as well as impeller and vanes arranged therein. Compressed air is used in the engine as main power, and external wind resistance are received for use as auxiliary power, thereby driving the impellers and vanes to operate to generate power output. The power drives the motor vehicle after it is shifted via a central main power output gearbox.

The above invention firstly proposed a wind-powered pneumatic engine which utilizes high pressure air as the main power and directly utilizes the wind resistance airflow as the auxiliary power, and a motor vehicle in which the need of converting wind resistance airflows into electrical power and the need of a complex mechanic-electric energy conversion system are eliminated, and the structure thereof is simplified. Therefore, a new way to save energy and find a substitute of fuel is provided.

In order to further optimize the performance of the wind-powered pneumatic engine and improve the operating efficiency of the wind-powered pneumatic engine and the motor vehicle, based on the aforementioned application, another U.S. patent application Ser. No. 12/377,513 (WO 2008/022556) filed by the applicant provides a combined wind-powered pneumatic engine. This engine comprises left and right wind resistance engines operating independently and a plurality of first compressed air engines arranged around the left and right wind resistance engines. The left and right wind resistance engines comprise a second impeller and the first compressed air engines comprise a first impeller. The power outputted by the left wind resistance engines and its peripheral first compressed air engines, as well as the power outputted by the right wind resistance engine and its peripheral first compressed air engines, is outputted as main power through a left power output shaft, a right power output shaft, a reversing wheel and gear.

However, the above mentioned wind-powered pneumatic engine and motor vehicle using compressed air as the source of main power are still a new technology. Therefore, there remains a need of further perfection and improvement to the structure of the wind-powered pneumatic engine and the motor vehicle employing the wind-powered pneumatic engine as discussed above. Particularly in view of power performance, there remains a need of further perfection and improvement for the structure of compressed air engine to sufficiently utilize compressed air and raise the use efficiency of compressed air, thus obtaining an optimal cooperation among the input compressed air, impeller and vanes.

SUMMARY OF THE INVENTION

The object of the present application is to enable gas to do work when it enters a compressed air engine and to do work again when it is discarded from the compressed air engine.

In accordance with an aspect of the present application, a compressed air engine comprises a housing, an impeller body and a primary power output shaft, the impeller body is fixed on the primary power output shaft and located in the housing, an ejecting inlet for ejecting air to the impeller body is provided on the housing, a plurality of working chambers are provided on the circumference surface of the impeller body which matches with the inner surface of the housing, the inner surface of the housing closes the working chambers so that the compressed air ejected to the working chambers from the ejecting inlet not only pushes the impeller body to rotate but also is temporarily stored in the working chamber, and an ejecting outlet is provided on the housing for making the compressed air temporarily stored in the working chamber to expand outwards and do work to further push the impeller body to rotate.

The plurality of working chambers are concyclic and distributed evenly around the axis of the primary power output shaft. The ejecting inlet and the ejecting outlet are concyclic and distributed alternately. A silencer chamber is provided on the housing, the ejecting outlet communicates with the silencer chamber, and the silencer chamber communicates with the outside of the housing through a first-order outlet provided on the housing. The silencer chambers comprise a continuous silencer groove or a plurality of intermittent silencer grooves. The silencer chambers are the intermittent silencer grooves which are concyclic and distributed evenly on the housing. The working chambers take a form of a triangle formed by three curves connected end to end viewed from a section perpendicular to the axis of the primary power output shaft. The working chambers have the same section shape and the acmes corresponding to the working chambers are on a circle of which the center is the axis of the primary power output shaft.

The application of a compressed air engine in a motor vehicle is also disclosed.

A motor vehicle comprises the abovementioned compressed air engine, a compressed air tank, an air-jet system, a drive train and wheels. The air-jet system has an inlet and an air-jet nozzle. The output of the compressed air tank is connected to the inlet of the air jet system via a pipeline. The air-jet nozzle ejects compressed air into a working chamber of the compressed air engine through the ejecting inlet. The primary power output shaft is connected to the drive train via a clutch and the drive train is connected to the wheels.

The present application has the following technical effects. Compressed air can push the impeller body to rotate when it is ejected into the compressed air engine. In addition, since the working chamber is enclosed by the inner surface of the housing, the compressed air ejected into the working chamber of compressed air engine is compressed and temporarily stored, and until then when the working chamber rotates to the position of the ejecting outlet, the compressed air expands and ejects. According to the law of conservation of momentum, the impeller body is certainly to be pushed to further rotate to do work.

DETAILED DESCRIPTION

Figure 1:
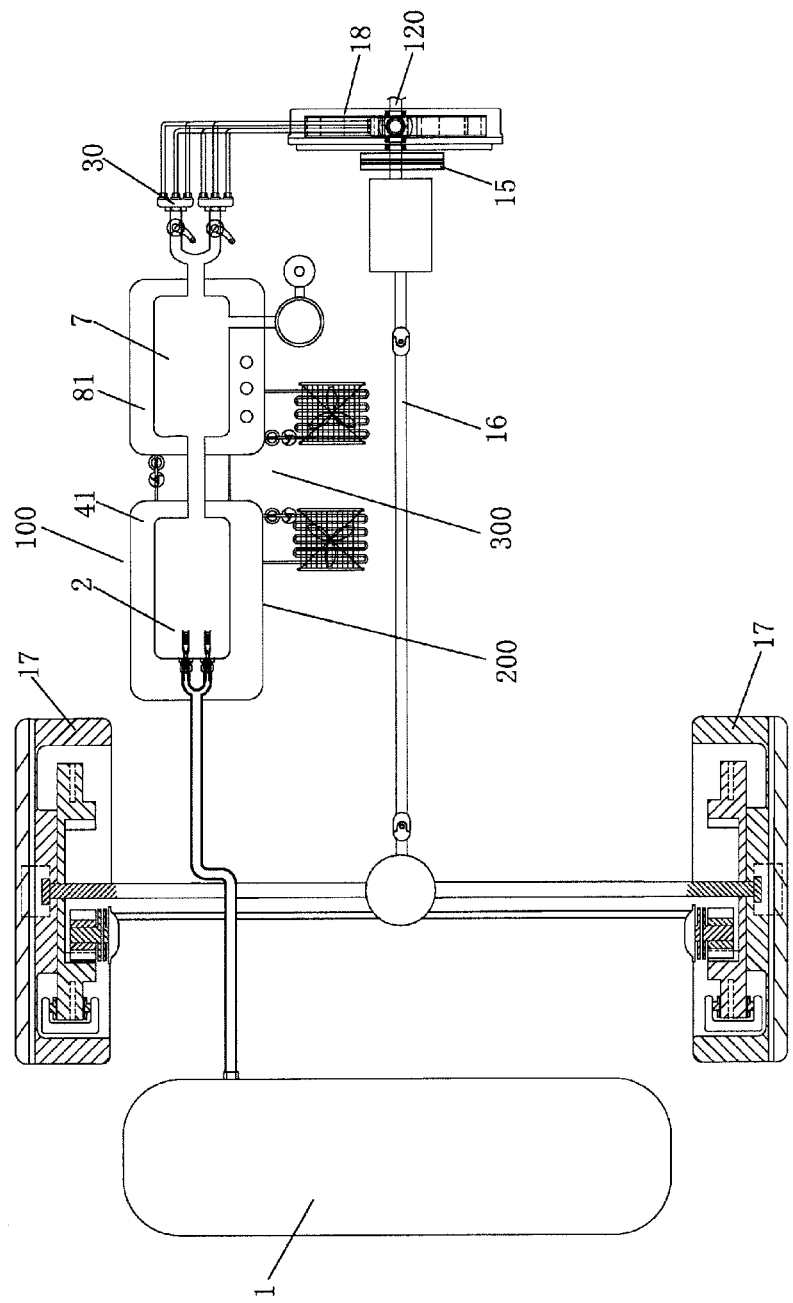
FIG. 1 is a schematic structural view of the motor vehicle according to an embodiment (only two wheels are illustrated).

As shown in FIG. 1 to FIG. 7, a motor vehicle according to this embodiment comprises a compressed air engine 18, a compressed air tank 1, an air-jet system 400, a drive train 16 and wheels 17. The air-jet system has an inlet and an air-jet nozzle 60, wherein the inlet of the air-jet system is connected to the output of the compressed air tank via a pipeline and compressed air is ejected into a working chamber of the compressed air engine from an ejecting inlet by the air-jet nozzle 610. The primary power output shaft 120 of the compressed air engine 4 is connected to the drive train 16 via a clutch 15. The drive train 16 is connected to the wheels 17.

Figure 2:
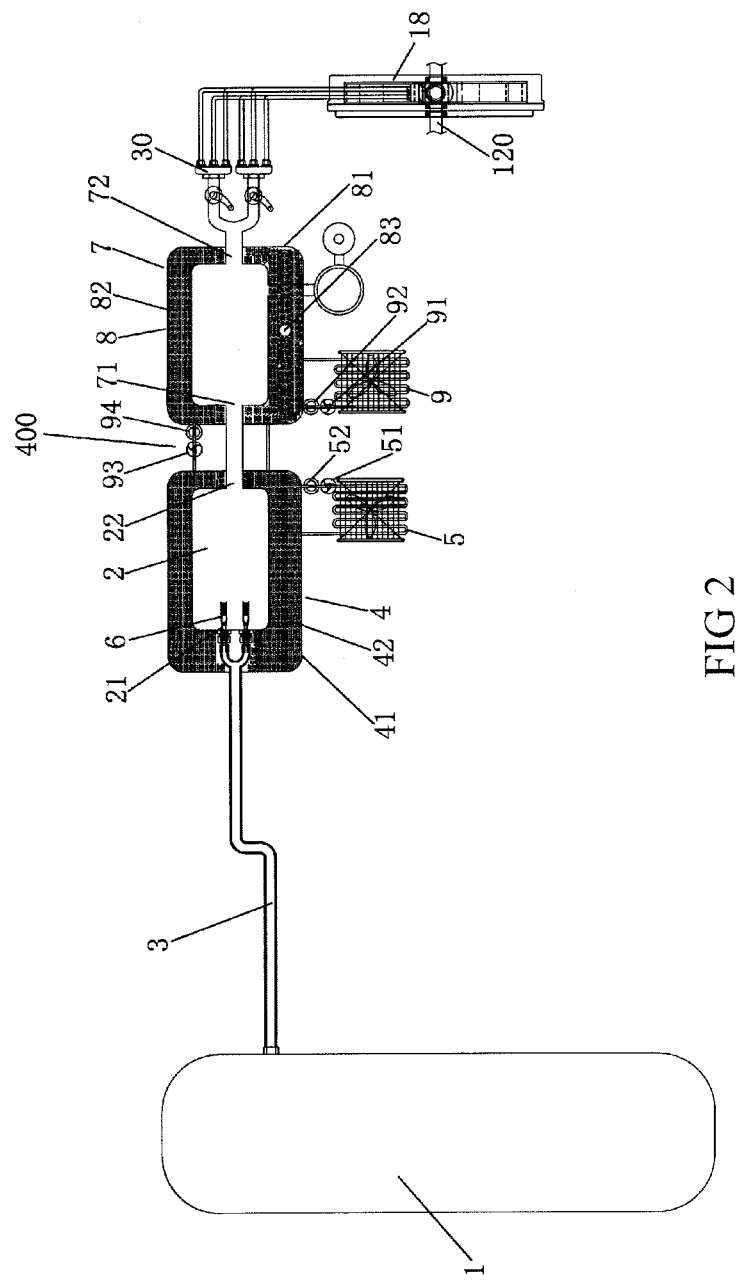
FIG. 2 is a schematic structural view of the air-jet system of the motor vehicle according to an embodiment.

As shown in FIG. 1 and FIG. 2, the air-jet system 400 comprises a pressure reducing gas storage device 100, a distributor 30 and the air-jet nozzle. The output of the compressed air tank 1 is connected to an inlet of the pressure reducing gas storage device via a pipeline 3. The outlet of the pressure reducing gas storage device 100 is connected to the distributor 30. The distributor 30 is used to distribute the gas outputted by the pressure reducing gas storage device 100 into multiple routes of gas, each of which is ejected by a corresponding air-jet nozzle 60. The pressure reducing gas storage device 100 comprises a gas storage tank 200 and a heat exchanger 300. The gas storage tank 200 comprises a first air chamber 2 having a first inlet 21 and a first outlet 22. The first inlet 21 is used to input air and the first outlet 22 is used to output air. The two ends of the pipeline 3 are connected to the compressed air tank 1 and the first inlet 21 of the first air chamber 2, respectively. There may be provided one or more pipelines 3. The cross section area of the pipeline 3 is less than that of the compressed air tank 1 and less than that of the first air chamber 2. The heat exchanger 300 comprises a first heat exchange unit 4 arranged on the first air chamber 2. The first heat exchange unit 4 comprises a first temperature regulation chamber 41 surrounding the first air chamber 2 and a first medium 42 filled between the first temperature regulation chamber 41 and the first air chamber 2. The first medium 42 may be liquid (for example, water) or gas or other heat exchangeable mediums. The temperature of the first medium 42 is higher than that of the gas within the first air chamber 2 so that the compressed air in the compressed air tank 1 is released into the first air chamber 2 via the pipeline 3 and then exchanges heat with the first medium 42. The heated air is output from the first outlet 22 of the first air chamber 2. The first air chamber 2 may be made of a material having good heat conduction property so as to facilitate the heat exchange of the air in the first air chamber 2 with the first medium 42. The first temperature regulation chamber 41 may be made of a material which is thermal insulation or has poor heat conduction property so that the heat is difficult to be dissipated into the ambient air.

The first heat exchange unit 4 is connected to the cooler 5 of a refrigeration air-conditioning. Each of the two ends of the cooler 5 is connected to the first temperature regulation chamber 41 to form a refrigeration cycle loop. The cooler 5 is provided with a first circulating pump 51 and a first circulating pump switch 52 for controlling the switch of the first circulating pump 51. The temperature of the first medium 42 in the first temperature regulation chamber 41 decreases after the first medium 42 exchanges heat with the air in the first air chamber 2. The first medium 42 of which the temperature is decreased circulates in the cooler 5 and the first temperature regulation chamber 41. The refrigeration air-conditioning circulates the ambient air to exchange heat with the cooler 5 so that the ambient air is cooled to achieve refrigeration effect.

The air output from the compressed air tank 1 is ejected via the air-jet nozzle after it is heated by the first heat exchange unit 4 of the pressure reducing gas storage device 100 so that condensation or even freezing will not occur at the air-jet nozzle 60 due to lower temperature. Meanwhile, the effect of decreasing the temperature of ambient air is achieved by connecting the first heat exchange unit 4 to the cooler 5 and using the first medium 42 whose temperature has been decreased as circulating medium. Therefore, energy is saved.

Figure 3:
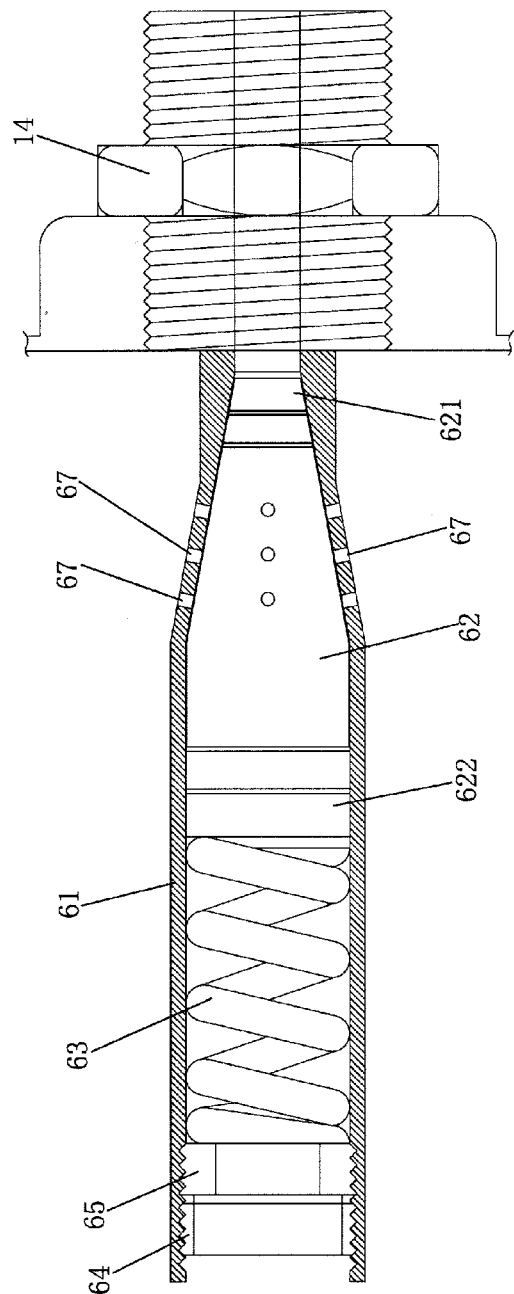
FIG. 3 is a schematic structural view showing air pressure regulator at a close configuration.
Figures 4, 5:
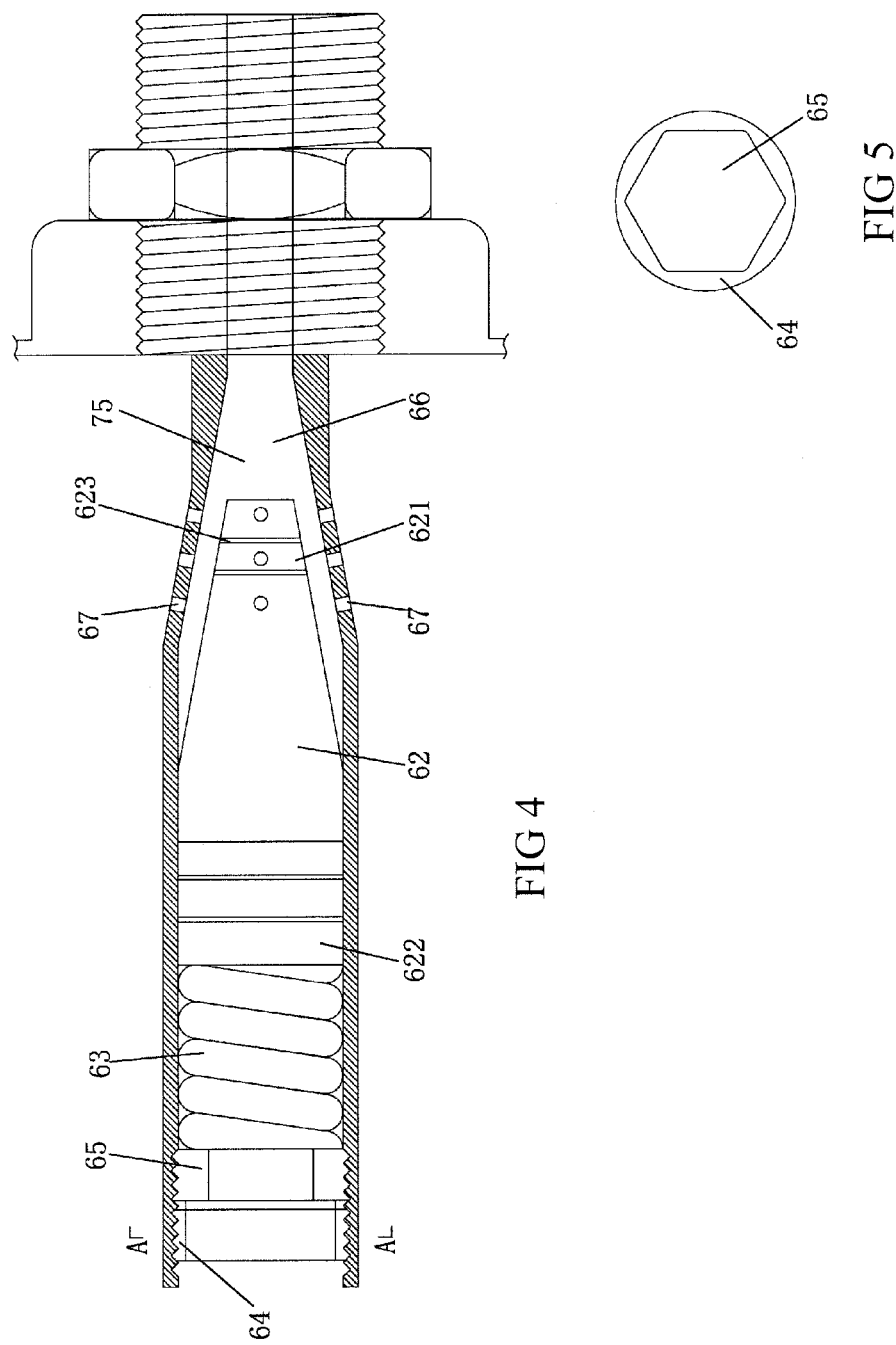
FIG. 4 is a schematic structural view showing air pressure regulator at an open configuration.
FIG. 5 is a sectional view along the line A-A in FIG. 4.

As shown in FIG. 3 to FIG. 5, the air-jet system may further comprise an air pressure regulator 6 for maintaining the air pressure in the first air chamber 2 at a predetermined value. The air pressure regulator 6 comprises a housing 61, a valve core 62, an elastic body 63, and a fixed block including a locking block 64 and a regulating block 65. The housing 61 is mounted at the first inlet 21 of the first air chamber 2 via a fastener 14. The housing 61 is partly located within the first air chamber 2 and partly extends out of the first air chamber 2. The housing 61 has a housing cavity 66 axially running therethrough and an airway 67 radially running therethrough. The airway 67 is in communication with the first air chamber 2. The valve core 62 is located within the housing cavity 66 and sealingly and slidably fitted with the housing 61. Two ends of the valve core 62 in the axial direction of the housing 61 are a sealing end 621 and a regulation end 622. The sealing end 621 may seal the airway 67 and/or an air guiding port 611. The elastic body 63 may be capable of deforming expansively along the axial direction of the housing 61. Two ends of the elastic body 63 bear against the regulation end 622 and the regulating block 65, respectively. The locking block 64 is thread connected to the housing 61 and presses the regulating block 65 against the elastic body 63. The sealing end 621 of the valve core is in the form of truncated cone, and an elastic sealing ring 623 is fixed on the contour surface of the sealing end 621. On the section perpendicular to the axis of the housing 61, the cross section area of the sealing end 621 of the valve core is less than that of the regulation end 622. The pressure applied on the sealing end 621 includes the air pressure of the air input from the pipeline 3, and the pressure applied on the regulation end 622 includes the air pressure in the first air chamber 2 and the elastic force of the elastic body 63. The elastic body is for example a spring, or other components capable of deforming expansively along the axis direction of the housing.

The working principle of the air pressure regulator is described below. When the air pressure of the gas input via the pipeline 3 is stable, a pressure reducing passage 75 is formed between the valve core 62 and the housing 66 so that the gas in the pipeline 3 can enter the first air chamber 2 through the pressure reducing passage 75 and the airway 67. When the air pressure of the gas input via the pipeline 3 is higher than a predetermined value, the air pressure of the input gas pushes the valve core 62 to move toward the side of the regulation end 622, and thereby the volume of the pressure reducing passage 75 increases and the air pressure in the first air chamber 2 decreases. When the air pressure of the gas input via the pipeline 3 is lower than the predetermined value, the force applied to the regulation end 622 is larger than that applied to the sealing end 621 so that the valve core moves toward the side of the sealing end 621, and thereby the volume of the pressure reducing passage 75 decreases and the air pressure in the first air chamber 2 increases. When the air pressure of the gas input via the pipeline 3 changes, the valve core moves linearly according to the variation of the forces applied to the sealing end 621 and the regulation end 622 so as to stabilize the air pressure in the first air chamber 2 at a predetermined air pressure. When the air pressure regulator is turned off, the sealing end 621 blocks the airway 612 and the gas in the pipeline 3 cannot enter the first air chamber 2. The air pressure of the gas outputted by the pressure reducing gas storage device can be stabilized at a predetermined air pressure by providing the air pressure regulator.

The prestressing force of the elastic body 63 may be adjusted by screwing or unscrewing the regulation block 64 so that the initially set air pressure of the air pressure regulator may be changed. There are other ways to change the initially set air pressure of the air pressure regulation, for example, by changing the regulation end of the valve core, the cross section area of the sealing end, or by changing the area of the regulation block 65.

The pressure reducing gas storage device may further comprise a second air chamber 7 and a second heat exchange unit 8. In the direction of airflow, the first air chamber 2 is in front of the second air chamber 7. The second air chamber 7 has a second inlet 71 and a second outlet 72. The second inlet 71 is connected to the first outlet 22 of the first air chamber 2. The second heat exchange unit 8 comprises a second temperature regulation chamber 81 surrounding the second air chamber 7, a second medium 82 such as liquid or gas filled between the second temperature regulation chamber 81 and the second air chamber 7, and a heater 83 for heating the second medium 82. The heater 83 is for example, a solar energy heater, electrical heater, microwave heater or other heaters capable of heating a medium. There can be provided one or more heaters and there also can be provided one or more kinds of heaters. The second temperature regulation chamber 81 is connected to a second coil 9 of a heating air-conditioning to form a heating cycle loop. The second coil 9 is provided with a second circulating pump 91 and a second circulating pump switch 92 for controlling the switch of the second circulating pump 91. The heated second medium 82 circulates within the second temperature regulation chamber 81 and the second coil 9. The heating air-conditioning circulates ambient air to exchange heat with the second coil 9 so that the temperature of ambient air increases to achieve the effect of heating. The air may be further heated by the second heat exchange unit 8 after being heated by the first heat exchange unit 4, so that it is more difficult to condense or even freeze the air-jet nozzle of the air-jet system.

In addition, the first temperature regulation chamber 41 and the second temperature regulation chamber 81 are connected via a pipeline to form a cycle loop. This cycle loop is provided with a third circulating pump 93 and a third circulating pump switch 94 for controlling the switch of the third circulating pump 93.

The heat exchanger may only comprise a first heat exchange unit which heats air in an air storage tank by means of heat exchange. There can be provided one or more first heat exchange units. The heat exchanger may also only comprise a second heat exchange unit having a heater. There can be provided one or more second heat exchange units. The heat exchanger may also comprise both of the first and second heat exchange units.

Figure 6:
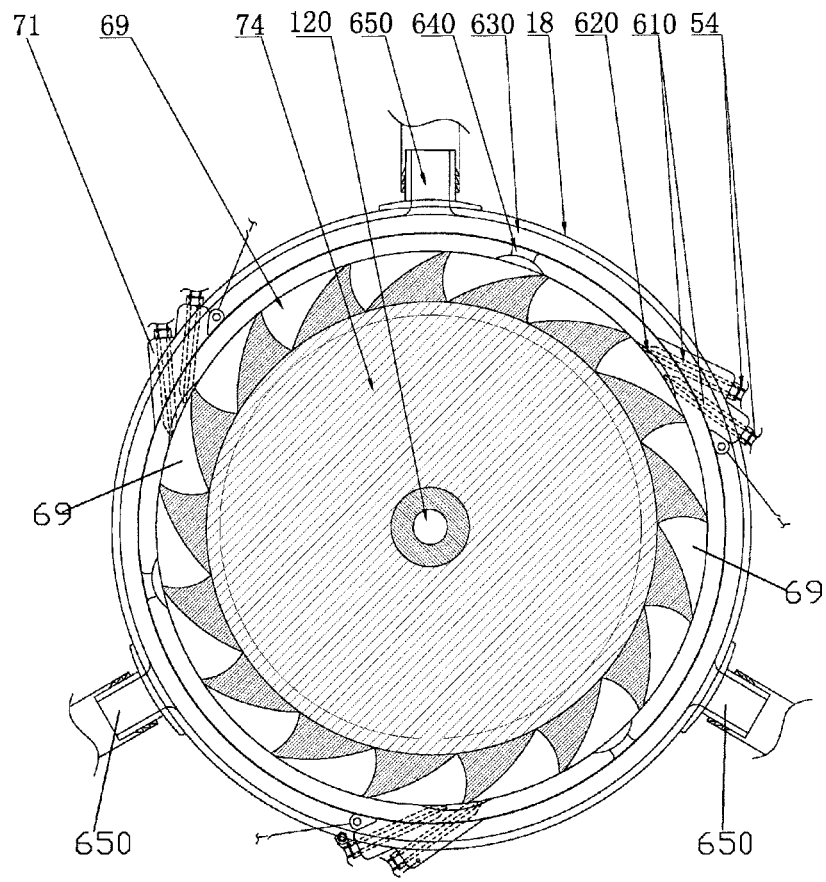
FIG. 6 is a top schematic view of a compressed air engine.
Figure 7:
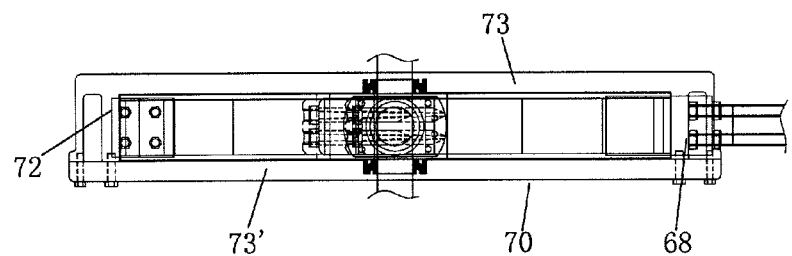
FIG. 7 is a front schematic view of the compressed air engine.

As shown in FIG. 6 and FIG. 7, the compressed air engine 18 further comprises a housing 70 and a round impeller body 74 located within the housing 70. The housing 70 comprises an annular side casing 72, an upper cover plate 73 and a lower cover plate 73'. The upper cover plate 73 and lower cover plate 73' are respectively fixed at the upper and lower openings of the annular side casing 72 so that the annular side casing 72, the upper cover plate 73 and lower cover plate 73' form a closed impeller body chamber 68. The impeller body 74 is located within the impeller body chamber 68 and the central portion of the impeller body 74 is fitted on the primary power output shaft 120. By notching on the circumference surface of the impeller body 74 which joints with the inner surface of the side casing 72, a set of working chambers 69 are formed and distributed evenly around the axis of the primary power output shaft 120. On the section perpendicular to the axis of the primary power output shaft 120, the working chamber 69 takes a form of a triangle formed by three curves connected end to end. There may be one or more sets of working chambers 69. The working chambers may be a through-slot structure axially running through on the impeller body. The inner surfaces of the upper cover plate, the lower cover plate and the side casing close the working chamber. The working chambers may also be of a non-through-slot structure provided in the middle of the circumference surface of the impeller body and the inner surface of the side casing closes the working chambers. Of course, the working chamber may also be closed by the inner surfaces of the upper cover plate and the lower cover plate, or by the inner surfaces of the lower cover plate and the side casing. That is to say, the working chambers are closed by the inner surface of the casing.

The inner surface of the side casing 72 is also provided with a plurality of ejecting inlets 620 and a plurality of ejecting outlets 640. The ejecting inlets 620 and ejecting outlets 640 are arranged alternately. An annular first-order silencer chamber 630 is also provided within the side casing 72. A plurality of first-order exhaust ports 650 are provided on the external surface of the side casing 72, and each of the ejecting outlets 640 has a corresponding first-order exhaust port 650. The ejecting outlets 640 communicate with the first-order exhaust ports 650 via the first-order silencer chamber 630. The ejecting inlets 620 communicates with none of the ejecting outlets 640, the first-order exhaust port 650 and the first-order silencer chamber 630. The ejecting outlets 640 and their corresponding first-order exhaust port 650 are spaced at an angle on the circumference centered on the axis of the primary power output shaft 120. An air-jet nozzle seat 71 is fixed on the position corresponding to each of the ejecting inlets 620 on the side casing 72. Each air-jet nozzle seat 71 is fixed with two air-jet nozzles 610. Each of the air-jet nozzles 610 extends into the corresponding ejecting inlet 620 and is connected to a gas ejecting pipe 54, and the axes of the two air-jet nozzles 610 on each of the ejecting inlets 620 form an acute angle. The compressed air in the compressed air tank 20 is transferred into the working chambers 69 via the gas ejecting pipe 54 and the air-jet nozzle 610. For each working chamber 69, the air ejected by the air-jet nozzle 610 drives the impeller body 74 to rotate and is compressed to be temporarily stored in the working chambers 69. When moving to the ejecting outlets 640, the temporarily stored gas in the working chamber 69 expands and jets out from the ejecting outlets 640 at a high speed. The reaction force formed when the gas is ejected again drives the impeller body 74 to rotate. When the impeller body 74 rotates, the primary power output shaft 120 is driven to rotate, which further drives the drive train 11 of the motor vehicle. The first-order silencer chamber may be a continuous and annular silencer groove, or be a plurality of intermittent silencer grooves which are concyclic and distributed evenly around the primary power output shaft.

For each working chamber 69, it takes a period of time from receiving the gas ejected by the air-jet nozzle 610 to ejecting the gas from the ejecting outlets 640. During the period of time, the gas is compressed and temporarily stored in the working chamber 69 so that the reaction force formed when the gas is ejected is larger and thus more power can be provided for the motor vehicle. Since the working chamber 69 is closed by the inner surface of the housing, it facilitates the compression and temporary storage of the compressed gas.

Although the above description makes explanation in detail for the present application in reference to preferred embodiments, the practice of the present application should not be construed to be limited to these descriptions. A person skilled in the art can make various simple deductions or replacements without departing from the spirit and concept of the present application, which should be construed to fall into the scope of the appended claims of the present application.

What is claimed is:

1. A compressed air engine, comprising a housing, an impeller body and a primary power output shaft, wherein the impeller body is fixed on the primary power output shaft and located within the housing, an ejecting inlet is provided on the housing for ejecting air to the impeller body in the housing, a plurality of working chambers are provided on the circumference surface of the impeller body which matches with the inner surface of the housing, the inner surface of the housing closes the working chambers so that the compressed air ejected to the working chambers from the ejecting inlet pushes the impeller body to rotate and is temporarily stored in the working chamber, and an ejecting outlet is provided on the housing so that the compressed air temporarily stored in the working chamber expands outwards when the compressed air is rotated to the gas ejecting outlet and do work to further push the impeller body to rotate, wherein a first-order silencer chamber is provided on the housing, the ejecting outlet communicates with the first-order silencer chamber and the silencer chamber communicates with the outside of the housing through a first-order outlet proved on the housing, and wherein the silencer chambers comprise a continuous silencer grove or a plurality of intermittent silencer grooves.

2. The compressed air engine according to claim 1, wherein the silencer chambers are the intermittent silencer grooves which are concyclic and distributed evenly on the housing.

3. The compressed air engine according to claim 1, wherein the silencer chambers are the continuous silencer groove which is an annular groove around the primary power output shaft.

4. A motor vehicle comprising a compressed air engine, wherein the compressed air engine comprises a housing, an impeller body and a primary power output shaft, wherein the impeller body is fixed on the primary power output shaft and located with the housing, an ejecting inlet is provided on the housing for ejecting air to the impeller body in the housing, a plurality of working chambers are provided on the circumference surface of the impeller body which matches with the inner surface of the housing, the inner surface of the housing closes the working chambers so that the compressed air ejected to the working chambers from the ejecting inlet pushes the impeller body to rotate and is temporarily stored in the working chamber, and an ejecting outlet is provided on the housing so that the compressed air temporarily stored in the working chamber expands outwards when the compressed air is rotated to the gas ejecting outlet and do work to further push the impeller body to rotate, wherein the motor vehicle further comprises:

a compressed air tank, an air-jet system having an inlet and an air-jet nozzle, a drive train and wheels, wherein the output of the compressed air tank is connected to the inlet of the air-jet system via a pipeline, compressed air is ejected into a working chamber of the compressed air engine by the air-jet nozzle through the ejecting inlet, the primary power output shaft is connected to the drive train via a clutch, and the drive train is connected to the wheels.

5. A motor vehicle comprising a compressed air engine, wherein the compressed air engine comprises a housing, an impeller body and a primary power output shaft, wherein the impeller body is fixed on the primary power output shaft and located within the housing, an ejecting inlet is provided on the housing for ejecting air to the impeller body in the housing, a plurality of working chambers are provided on the circumference surface of the impeller body which matches with the inner surface of the housing, the inner surface of the housing closes the working chambers so that the compressed air ejected to the working chambers from the ejecting inlet pushes the impeller body to rotate and is temporarily stored in the working chamber, and an ejecting outlet is provided on the housing so that the compressed air temporarily stored in the working chamber expands outwards when the compressed air is rotated to the gas ejecting outlet and do work to further push the impeller body to rotate, wherein a first-order silencer chamber is provided on the housing, the ejecting outlet communicates with the first-order silencer chamber and the silencer chamber communicates with the outside of the housing through a first-order outlet provided on the housing, and wherein the motor vehicle further comprises:

a compressed air tank, an air-jet system having an inlet and an air-jet nozzle, a drive train and wheels, wherein the output of the compressed air tank is connected to the inlet of the air-jet system via a pipeline, compressed air is ejected into a working chamber of the compressed air engine by the air-jet nozzle through the ejecting inlet, the primary power output shaft is connected to the drive train via a clutch, and the drive train is connected to the wheels.

* * * * *